US010876987B1

(12) United States Patent
Reyes et al.

(10) Patent No.: US 10,876,987 B1
(45) Date of Patent: Dec. 29, 2020

(54) APPARATUS, METHODS AND SYSTEM FOR TEMPERATURE GRADIENT AGING WITH IN-SITU ELECTRICAL MONITORING

(71) Applicant: National Technology & Engineering Solutions of Sandia, LLC, Albuquerque, NM (US)

(72) Inventors: Karla Rosa Reyes, Livermore, CA (US); Josh A. Whaley, Livermore, CA (US); Peter Anand Sharma, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 143 days.

(21) Appl. No.: 16/196,231

(22) Filed: Nov. 20, 2018

Related U.S. Application Data

(60) Provisional application No. 62/591,391, filed on Nov. 28, 2017.

(51) Int. Cl.
  *G01N 27/14* (2006.01)
  *G01N 27/04* (2006.01)

(52) U.S. Cl.
  CPC .......... *G01N 27/14* (2013.01); *G01N 27/041* (2013.01)

(58) Field of Classification Search
  CPC ....... G01N 27/14; G01N 27/041; H01L 35/32
  See application file for complete search history.

(56) References Cited

U.S. PATENT DOCUMENTS

| 8,688,390 B2 * | 4/2014 | Schroeder | H01L 35/34 136/201 |
| 2012/0213250 A1 * | 8/2012 | Snyder | G01N 25/32 374/179 |
| 2013/0247953 A1 * | 9/2013 | Muto | H01L 35/08 136/240 |
| 2016/0025801 A1 * | 1/2016 | Kim | G01R 31/2601 324/750.03 |
| 2020/0028060 A1 * | 1/2020 | Heremans | H01L 37/00 |

FOREIGN PATENT DOCUMENTS

CN          103472087      * 12/2013

* cited by examiner

*Primary Examiner* — Jay Patidar
(74) *Attorney, Agent, or Firm* — Medley, Behrens & Lewis, LLC

(57) ABSTRACT

An apparatus for making in-situ electrical measurements of a sample while the sample is subjected to a temperature gradient between a first side of the sample and a second side of the sample. The apparatus comprises a first heater and a second heater that are positioned in contact with the first side of the sample and the second side of the sample, respectively. The first heater and the second heater comprise respective faces that each have electrical contacts embedded therein. Electrical measurements pertaining to the sample can be made by way of the electrical contacts embedded in the faces. A temperature at either side of the sample can be monitored by way of thermocouples positioned inside the heaters in proximity to the faces of the heaters.

20 Claims, 5 Drawing Sheets

US 10,876,987 B1

APPARATUS, METHODS AND SYSTEM FOR TEMPERATURE GRADIENT AGING WITH IN-SITU ELECTRICAL MONITORING

RELATED APPLICATIONS

This application claims priority to U.S. Provisional Patent Application No. 62/591,391, filed on Nov. 28, 2017, and entitled "APPARATUS, METHODS AND SYSTEM FOR TEMPERATURE GRADIENT AGING WITH IN-SITU ELECTRICAL MONITORING", the entirety of which is incorporated herein by reference.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

In performance analysis of various materials, it is sometimes desirable to determine how aging of a material changes a performance characteristic of a material. Conventionally, a characteristic of a sample (e.g., internal resistance) is measured, the sample is aged by heating the material in an isothermal oven, and the characteristic measured again to determine a change in the characteristic of the sample due to aging. However, for some materials isothermal aging is not representative of real application conditions. For example, thermoelectric materials are generally operated with a temperature gradient being applied across the material while a current flows through the material. Conventional ovens for isothermal aging are unable to apply a temperature gradient to a sample. Furthermore, conventionally aging analyses have provided only a pre-aging measure of sample performance and a post-aging measure of sample performance, and do not indicate how performance of a sample changes over the entire range of time over which the sample is aged.

SUMMARY

The following is a brief summary of subject matter that is described in greater detail herein. This summary is not intended to be limiting as to the scope of the claims.

Various technologies are described herein that relate to performing in-situ electrical measurements of a material while applying a temperature gradient across the material. With more particularity, an apparatus is described herein that is configured to apply a temperature gradient to a sample of a thermoelectric material, and is further configured to facilitate measurement of one or more electrical characteristics of the sample while the temperature gradient is applied. The apparatus is therefore well-suited to analysis of the Soret effect and electromigration, which are driven by temperature gradients in a material and that affect electrical performance of a material.

In an exemplary embodiment, an apparatus that facilitates performing in-situ electrical measurements of a thermoelectric material subject to a temperature gradient comprises a first heater and a second heater that include respective first and second faces. The heaters are configured to heat their respective faces to desired temperatures. By way of example, the first heater heats the first face to a first temperature and the second heater heats the second face to a second temperature different from the first temperature. A sample is positioned between the heaters such that a first side of the sample is in contact with the first face and a second side of the sample is in contact with a second face. The first heater and the second heater thereby establish a temperature gradient between the first side and the second side of the sample.

In further embodiments, electrical terminals are embedded within the faces of the heaters to enable in-situ electrical measurements of the sample while the temperature gradient is applied to the sample. In one exemplary embodiment, two terminals are embedded in each of the first and second faces. When the sample is positioned between and in contact with the faces, the four terminals make electrical contact with the sample. The four terminals can be used to perform four-terminal resistance measurements, short-circuit current measurements, open-circuit voltage measurements, etc.

In still further embodiments, a temperature sensor is positioned within a body of each of the heaters. The temperature sensor outputs a signal that is indicative of a temperature of the face of the heater in which it is positioned. Hence, a first temperature sensor outputs a first signal indicative of the temperature of the first face, and a second temperature sensor outputs a second signal indicative of the temperature of the second face. In exemplary embodiments, the temperature sensors comprise respective thermocouples. The temperature sensors can be used to determine a temperature gradient actually applied to the sample. In combination with measurements of electrical characteristics of the sample performed by way of the electrical terminals described above, the measurements of the temperature by the temperature sensors can be used to calculate values of a Seebeck coefficient of the sample throughout a measurement period.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

DETAILED DESCRIPTION

Figure 1:
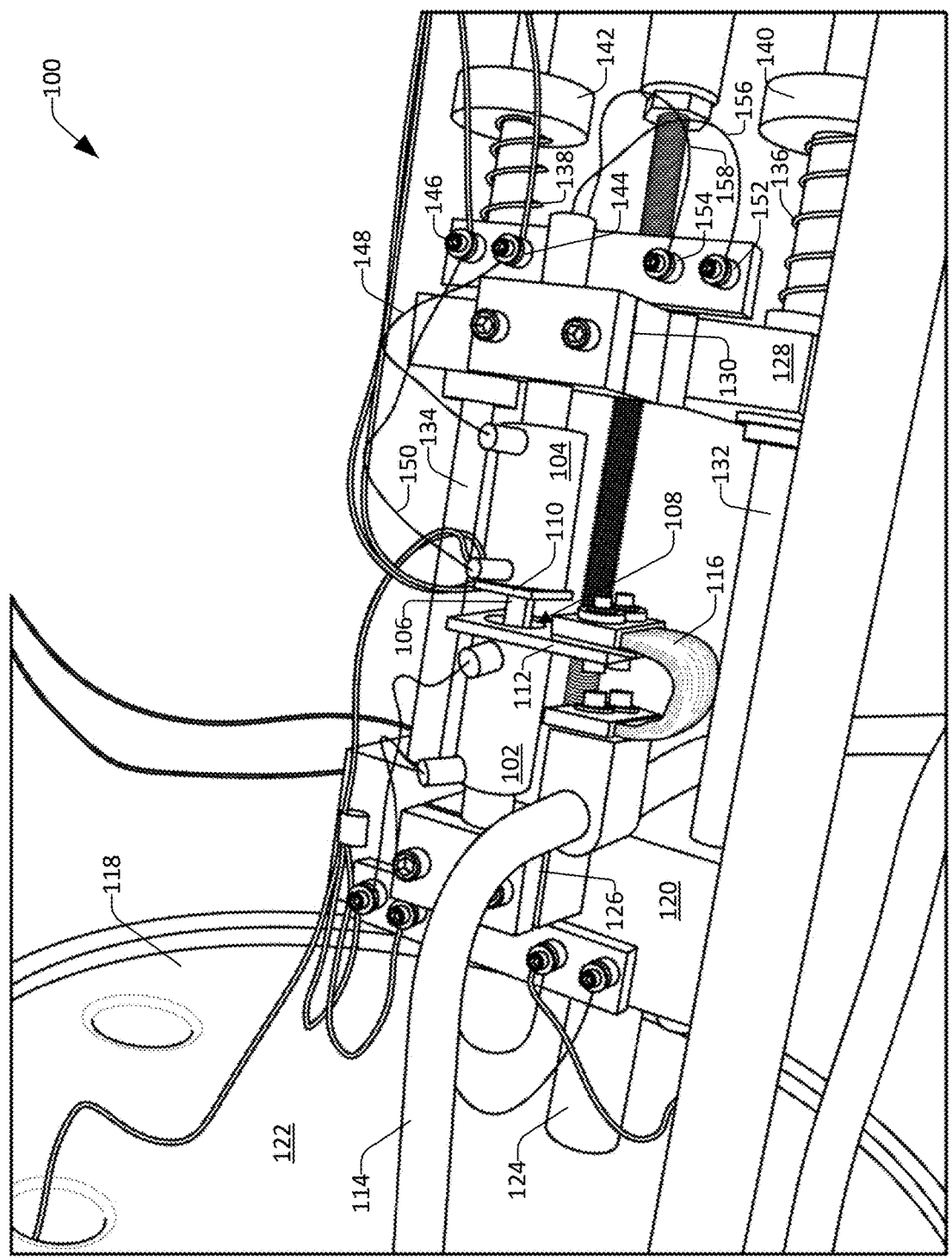
FIG. 1 is a functional block diagram of an exemplary system that facilitates applying a temperature gradient to a sample and making in-situ electrical measurements of the sample while the temperature gradient is applied.

Various technologies pertaining to in-situ measurement of electrical characteristics of a sample during application of a temperature gradient to the sample are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

With reference to FIG. 1, a perspective view of an exemplary system 100 that facilitates in-situ electrical measurement of a sample during application of a temperature gradient to the sample is shown. The system 100 includes two heaters 102, 104. A sample 106 is shown positioned between the heaters 102, 104 such that the sample 106 is in contact with a face 108 of the first heater 102 and a face 110 of the second heater 104. The heaters 102, 104 heat the sample 106 such that there is a temperature gradient between a first side of the sample 106 (a side in contact with the face 108 of the first heater 102) and a second side of the sample 106 (a side in contact with the face 110 of the second heater 104). The faces 108, 110 of the heaters 102, 104 can further include electrical contacts (not shown in FIG. 1) that are embedded in the faces 108, 110. These electrical contacts facilitate performance of electrical measurements of the sample 106 while a temperature gradient is being applied to the sample 106 by the heaters 102, 104. Temperature sensors (not shown in FIG. 1) included in the heaters 102, 104 can further facilitate monitoring of a temperature at the first side of the sample 106 and the second side of the sample 106 during heating of the sample 106.

Figure 2:
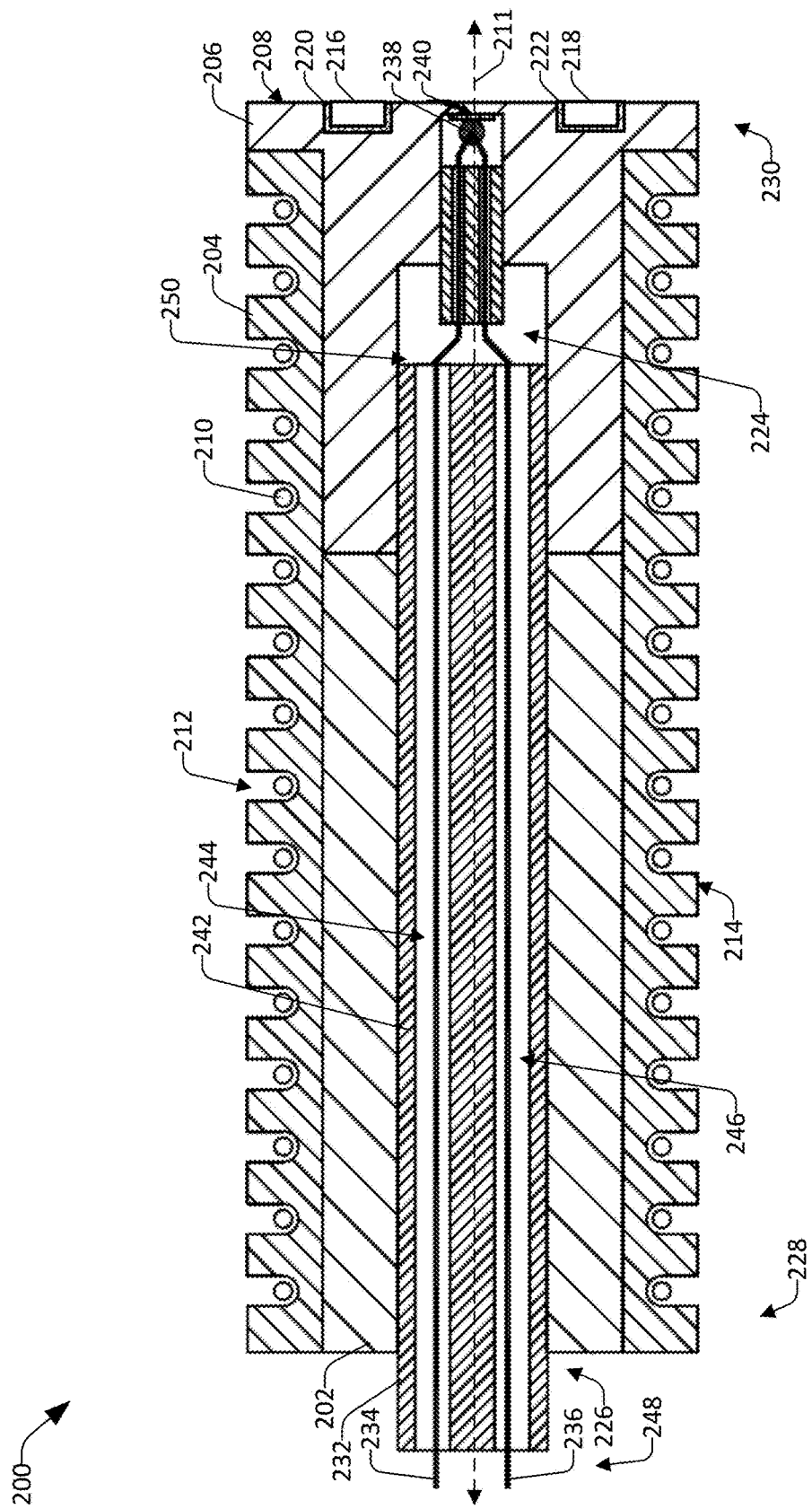
FIG. 2 is a cross-sectional side view of an exemplary heater that facilitates applying a temperature gradient to a sample and monitoring an electrical characteristic of the sample in-situ.

Referring now to FIG. 2, a cross-sectional side view of an exemplary heater 200 is shown. In exemplary embodiments, the heater 200 can be used as either or both of the heaters 102, 104. The heater 200 comprises a core 202 that is surrounded by an electrically insulating tube 204. In an exemplary embodiment, the core 202 is a substantially cylindrical metal element. By way of further example, the core 202 comprises nickel, which is substantially non-reactive with a variety of sample chemistries. In one exemplary embodiment, the core 202 comprises substantially pure nickel (e.g., at least 99% nickel by weight). At one end, the core 202 terminates in a plate 206 that forms a face 208 of the heater 200. In the exemplary heater 200 shown, the plate 206 is an integral part of the core 202, forming a single piece with the core 202. In other exemplary embodiments, the plate 206 can be a separate component that is attached to the core 202 by any of various affixing means (e.g., adhesives, fasteners, joining means such as brazing or welding, etc.). As set forth with respect to various embodiments described herein (e.g., the system 100), a sample is positioned such that the sample is held between respective faces of two heaters. In the exemplary heater 200, the face 208 of the plate 206 is therefore the thermal contact between the heater 200 and a sample. The heater 200 further comprises a winding 210 that is wound around the insulating tube 204. The winding 210 can be wound around the tube 204 such that the winding 210 is wound about an axis 211 that runs a length of the heater 204. The exemplary heater 200 includes grooves 212 in a surface 214 of the tube 204, wherein the winding 210 is positioned inside the grooves 212. The winding 210 can be, for example, a nichrome wire, a wire consisting of a nickel-copper alloy, a steel wire, or substantially any other winding suitable for resistive heating. A current is passed through the winding 210 to heat the core 202 (and thereby heat the plate 206 that is in contact with a sample). In an exemplary embodiment, the electrically insulating tube 204 is substantially or entirely composed of alumina, thereby conducting heat from the winding 210 to the core 202 while maintaining electrical isolation between the winding 210 and core 202.

To facilitate performing electrical measurements relative to a sample while a temperature gradient is applied to the sample, the heater 200 further comprises electrical contacts 216, 218 that are embedded in the plate 206 of the heater 200. When the face 208 of the heater 200 makes contact with a sample, the contacts 216, 218 also make contact with the sample. The contacts 216, 218 can be connected to electrical measurement apparatus (not shown in FIG. 2) that can use the contacts 216, 218 to provide measurements of voltage across a sample, current through a sample, or internal resistance of a sample.

Figure 3:
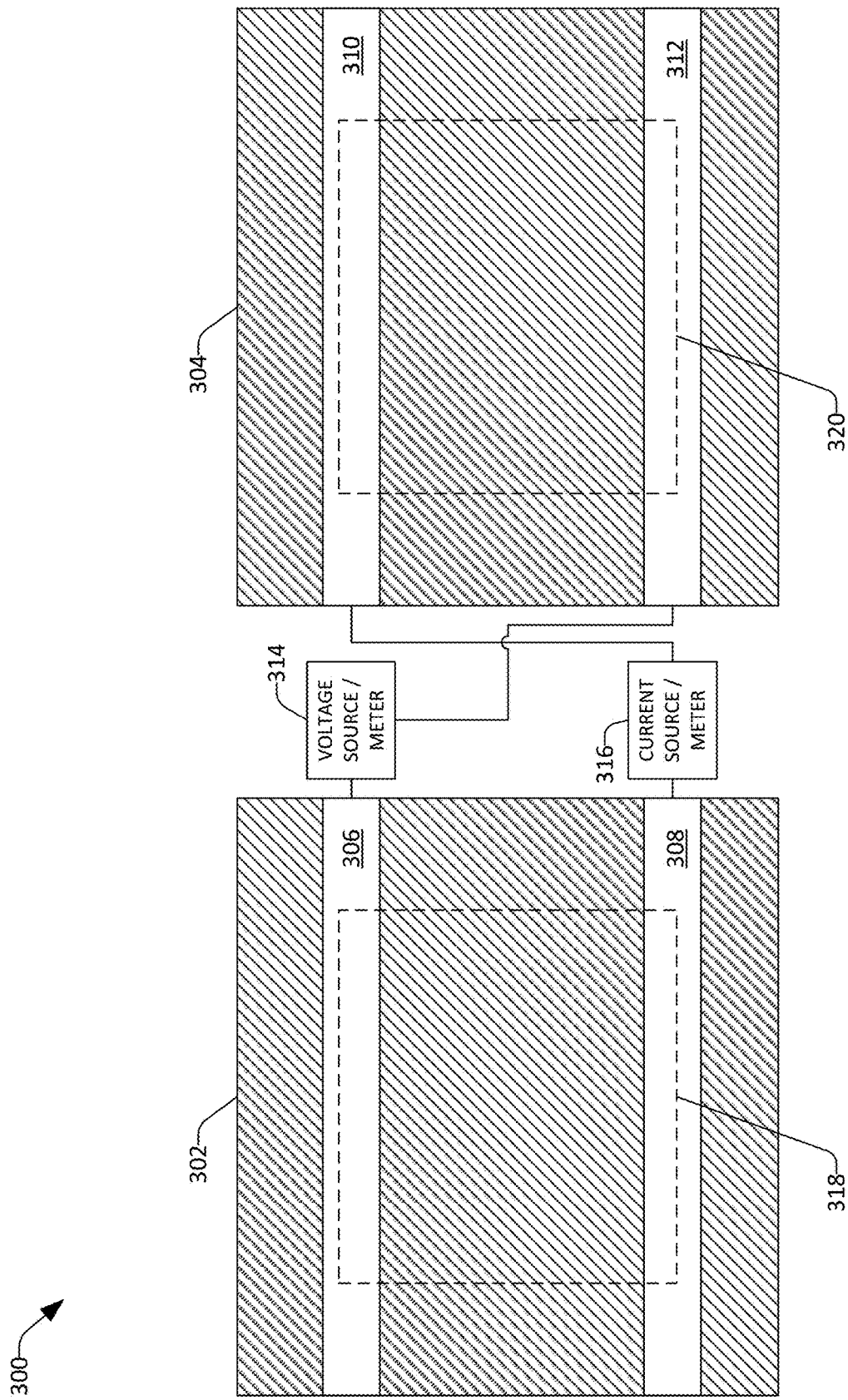
FIG. 3 is a conceptual diagram that illustrates a configuration of electrical measurement apparatus with respect to electrical contacts of exemplary heater faces.

For example, and with reference now to FIG. 3, a conceptual diagram 300 illustrating exemplary electrical connections between faces of two heaters and a sample is shown. In the conceptual diagram 300, head-on views of exemplary heater faces 302, 304 are shown. The first heater face 302 comprises a first electrical contact 306 and a second electrical contact 308, while the second heater face 304 comprises a third electrical contact 310 and a fourth electrical contact 312. The first electrical contact 306 and the fourth electrical contact 312 are connected to a voltage source/voltage meter 314, whereas the second electrical contact 308 and the third electrical contact 310 are connected to a current source/current meter 316. Further depicted in the conceptual diagram 300 of FIG. 3 are an outline 318 of a first side of a sample (not shown) positioned against the first heater face 302 and an outline 320 of a second side of the sample positioned against the second heater face 304. The first contact 306 and the second contact 308 are therefore in electrical contact with the first side of the sample, whereas the third contact 310 and the fourth contact 312 are in contact are in electrical contact with the second side of the sample. Accordingly, each of the voltage source/meter 314 and the current source/meter 316 is electrically connected to both the first side of the sample and the second side of the sample. The voltage source/meter 314 and the current source/meter 316 can therefore be used to perform various measurements of electrical characteristics of a sample when the sample is positioned between the faces 302, 304 of two heaters. By way of example, and not limitation, the voltage source/meter 314 and the current source/meter 316 can be used in connection with performing four-terminal resistance measurements of a sample positioned between the heater faces 302, 304. Illustrating further, the current source/meter 316 can be configured as a current source that injects a known current through the sample, and the voltage source/meter 314 can be configured as a voltage meter that measures a voltage across the sample while the current is being injected by the current source 316. Given the known injected current, the measured voltage is indicative of an internal resistance of the sample.

Referring again to FIG. 2, in exemplary embodiments, the contacts 216, 218 are flush with the face 208 of the heater 200 in order to ensure both thermal communication from the face 208 to a sample and electrical contact from the contacts 216, 218 to the sample. In other embodiments, electrical contacts can be attached to the face 208 of the heater 200. The electrical contacts 216, 218 can be made of substantially any material that is conductive and that can withstand a temperature desirably applied at the face 208 of the heater 200. By way of example, the electrical contacts 216, 218 can be composed of nickel, a nickel alloy, copper, a copper alloy, gold, etc. In some embodiments, a desirable composition of the contacts 216, 218 and the plate 206 that makes contact with a sample will depend on a material makeup of the sample. For instance, some materials can exhibit undesirable reaction chemistry with a sample. In one exemplary embodiment wherein the sample comprises bismuth telluride, the plate 206 comprises substantially pure nickel (e.g., greater than 99% nickel by weight), which is substantially non-reactive with bismuth telluride. Further, a desirable composition of the contacts 216, 218 and the plate 206 can depend on a temperature that is desirably applied at the plate 206 of the heater 200, since reactions between the contacts 216, 218 or the plate 206 and the sample can depend on temperature at an interface between the sample and the plate 206 or contacts 216, 218.

The exemplary heater 200 further includes insulating layers 220, 222 that surround the contacts 216, 218, respectively. The insulating layers 220, 222 electrically insulate the contacts 216, 218 from the plate 206 and each other. The insulating layers 220, 222 can be substantially any electrically insulating material that is able to withstand a temperature applied at the face 208 of the heater. In an exemplary embodiment, the insulating layers 220, 222 comprise alumina.

The heater 200 is further configured to facilitate measurement of a temperature at the face 208 of the heater 200. As shown in FIG. 2, the heater 200 comprises a cavity 224 that extends along at least a portion of the length of the heater 200 (e.g., along the axis 211). The cavity 224 forms an opening 226 at a first end 228 of the heater 200. The cavity 224 terminates at a second opposite end 230 of the heater 200, such that the cavity 224 is not open to the face 208 of the heater 200. A thermocouple 232 is positioned inside the cavity 224. The thermocouple 232 comprises a first lead 234 and a second lead 236 that are joined at a junction 238. When the thermocouple 232 is inserted into the cavity 224 of the heater 200, the junction 238 is positioned near the second end 230 of the heater 200, in proximity to the face 208 of the heater 200. The heater 200 further includes an electrical insulating element 240. The thermocouple 232 is positioned such that the junction 238 is in contact with the insulating element 240. The insulating element 240 electrically isolates the junction 238 from the plate 206. In an exemplary embodiment, the insulating element 240 comprises a sapphire window, an alumina layer, or other electrically insulating material. A temperature of the junction 238 is indicative of a temperature of the face 208 of the heater. The temperature of the junction 238 can be determined based upon a voltage between the first lead 234 and the second lead 236 of the thermocouple 232. The leads 234, 236 of the thermocouple 232 can be contained in a tube 242 of electrically insulating material that provides electrical isolation between the leads 234, 236 and the core 202. The tube 242 can be configured to fit within the cavity 224 such that the tube 242 and thermocouple 232 can be jointly inserted into the cavity 224. The insulating tube 242 can itself include a first cavity 244 and a second cavity 246, the cavities 244, 246 being open at each of two ends 248, 250 of the tube 242. The leads 234, 236 of the thermocouple 232 can be inserted into the cavities 244, 246, respectively, such that the leads 234, 236 do not make electrical contact with one another thereby shorting the junction 238.

Referring again to FIG. 1, in view of the description set forth above with respect to the exemplary heater 200 depicted in FIG. 2, it will be apparent to those of skill in the art that the heaters 102, 104 can be configured to facilitate in-situ measurement of electrical properties of the sample 106 while a temperature gradient is applied to each of two sides of the sample 106 by the heaters 102, 104. By way of example, a temperature difference between the first face 108 and the second face 110 can be measured by way of thermocouples positioned within the heaters 102, 104, respectively. Simultaneously, a voltage across the sample 106 can be measured by way of electrical terminals embedded in the faces 108, 110. The Seebeck coefficient of the sample 106 can then be calculated from the measured temperature difference and voltage. These measurements can be repeated substantially any number of times without reconfiguration of the system 100. The system 100 thereby facilitates generating a profile of the Seebeck coefficient of the sample 106 over time.

Various additional features pertaining to the system 100 are now described. The system 100 further includes a heat sink 112 that is attached to the face 108 of the first heater 102, a coolant pipe 114 that contains a coolant fluid, and a heat exchange element 116 that facilitates heat transfer between the heat sink 112 and the coolant pipe 114. When a coolant fluid is pumped through the coolant pipe 114, heat exchange between the heat sink 112 and the coolant fluid occurs, cooling the heat sink 112. The heat sink 112 being attached to the face 108 of the first heater 102, the face 108 is cooled by the cooling of the heat sink 112. The cooling elements 112, 114, 116 can therefore be used to cool the face 108 of the heater 102, allowing a below-ambient temperature to be applied to a side of the sample 106 that is in contact with the face 108 of the first heater 102.

In exemplary embodiments, the elements of the system 100 set forth above can be contained in a vacuum chamber 118 (shown in cut-away form). The system 100 further includes various apparatus that facilitate positioning of the heaters 102, 104 in desired positions relative to one another and to the sample 106 within the vacuum chamber 118. The exemplary system 100 shown also includes additional features to hold various electrical leads in desired positions in order to prevent shorts or disconnections that can inhibit reliability of the system 100 in operation. The system 100 includes a bracket 120 that is attached to an interior wall 122 of the vacuum chamber 118 by a joining member 124. A clamp 126 is positioned on the bracket 120, wherein the clamp 126 holds the heater 102 in a fixed position. The system further includes a second bracket 128 on which is mounted a second clamp 130 that holds the second heater 104. The second bracket 128 is movable along a pair of rails 132, 134 that are attached to the first bracket 120, so that a position of the second heater 104 is adjustable relative to a position of the first heater 102. Still further, the system 100 includes compression springs 136, 138 that are wound around the rails 132, 134, respectively. The spring 136 is positioned between a plate 140 that is fixedly attached to the rail 132 and the bracket 128. The spring 138 is positioned between a plate 142 that is fixedly attached to the rail 134 and the bracket 128. The compression springs 136, 138 exert a force on the bracket 128 that causes the face 110 of the second heater 104 to make firm contact with the sample 106. The system of brackets 120, 128 and springs 136, 138 thereby obviates the need for any additional materials to be placed between the faces 108, 110 of the heaters 102, 104 and the sample 106 to make good thermal contact between the heaters 102, 104 and the sample 106.

The system 100 can further include various posts for securing electrical leads that extend from the heaters 102, 104 and their faces 108, 110. By way of example, a first pair of posts 144, 146 is attached to the bracket 128. The posts 144, 146 can be used to secure respective leads 148, 150 that extend from a heating element of the heater 104. A second pair of posts 152, 154 can also be attached to the bracket 128. The second pair of posts 152, 154 can be used to secure respective leads 156, 158 that extend from a thermocouple that is positioned inside the heater 104.

Figure 4:
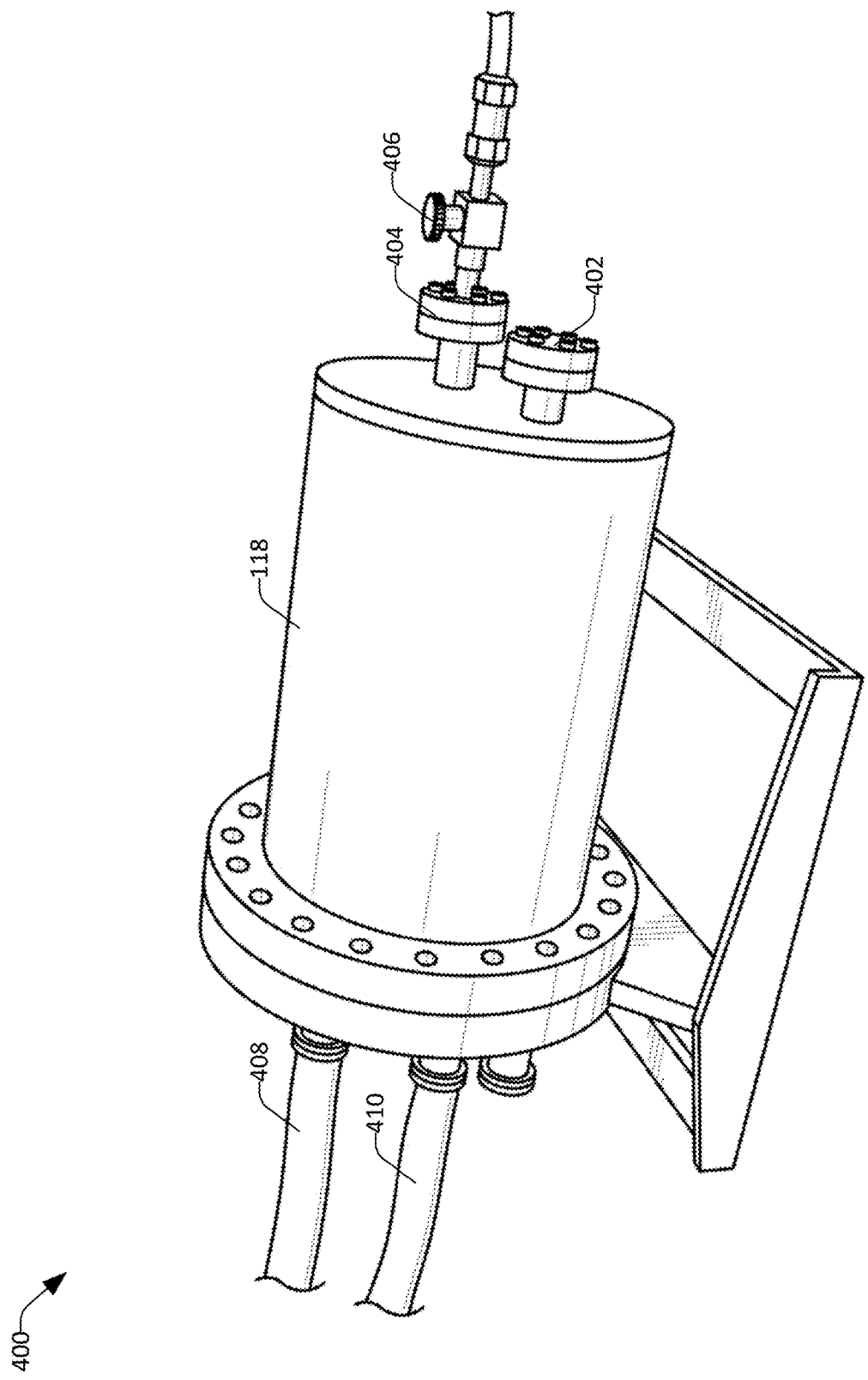
FIG. 4 is a perspective view of an exemplary vacuum chamber.

Referring now to FIG. 4, an external view 400 of the vacuum chamber 118 is shown. The system 100 depicted in FIG. 1 can be contained within the vacuum chamber 118 and an interior of the chamber 118 evacuated or filled with an inert gas. By way of example, the chamber 118 includes a first orifice 402 to which a pump can be attached in order to pump out air or other gases inside the chamber 118. The chamber 118 further includes a second orifice 404 to which a valve 406 is attached, wherein the valve 406 can be opened to introduce a gas to the interior of the chamber 118. Evacuating the interior of the chamber 118 or pumping an inert gas into the chamber 118 can prevent or inhibit undesirable chemical reactions between the sample 106 and the faces 108, 110 of the heaters 102, 104. The vacuum chamber 118 can further include inlet/outlet tubes 408, 410 by way of which various electrical leads of the system 100 can pass out of the chamber 118 to power sources, electrical measurement apparatus, etc.

Figure 5:
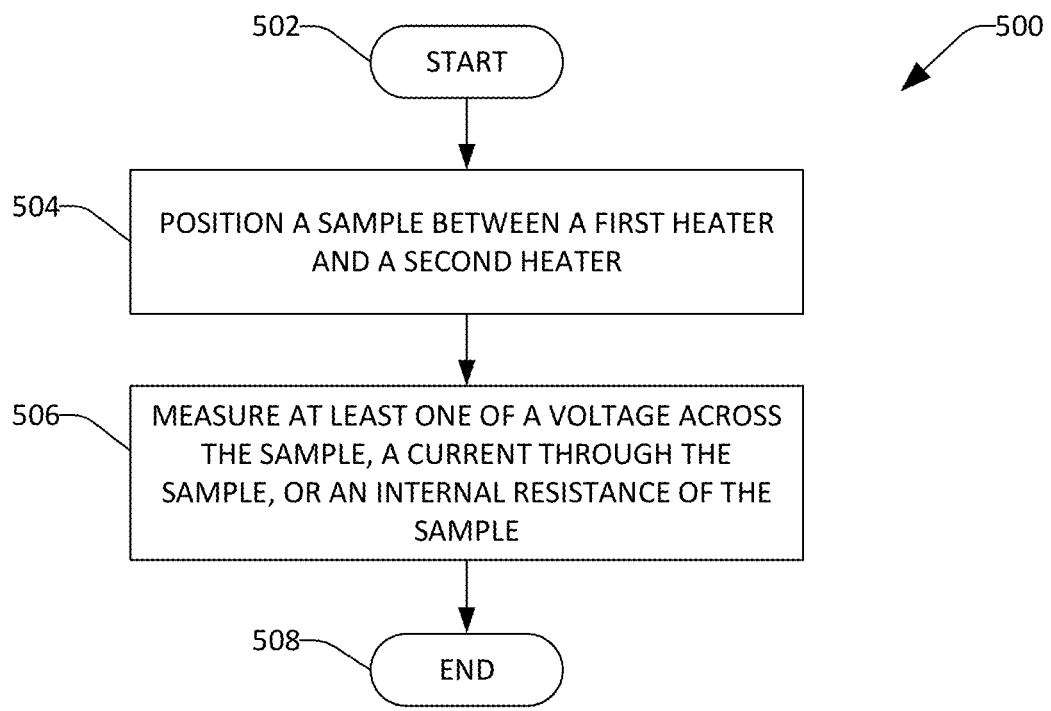
FIG. 5 is a flow diagram that illustrates an exemplary methodology for making in-situ electrical measurements of a sample while a temperature gradient is applied to the sample.

FIG. 5 illustrates an exemplary methodology relating to performing in-situ electrical measurements of a sample while a temperature gradient is applied to the sample. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Referring now to FIG. 5, a methodology 500 that facilitates measuring an electrical characteristic of a sample while a temperature gradient is applied to the sample is illustrated. The methodology 500 begins at 502, and at 504, a sample is positioned between a first heater and a second heater. By way of example, a first side of the sample is positioned in contact with a face of the first heater, and a second side of the sample is positioned in contact with a face of the second heater. The heaters can be configured to heat their respective faces, thereby applying a temperature gradient to the sample. For instance, the first heater can heat its face to a first temperature and the second heater can heat its face to a second temperature different from the first temperature. At 506, at least one of a voltage across the sample, a current through the sample, or an internal resistance of the sample is measured. Continuing the example, the voltage, the current, and/or the resistance can be measured by way of electrical terminals embedded in the faces of the first and second heaters. The methodology 500 completes at 508.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An apparatus for performing in-situ electrical measurements of a thermoelectric material, the apparatus comprising:
    a first heater comprising a first face;
    a second heater comprising a second face, wherein a sample is positioned between the first face and the second face such that a first side of the sample is in contact with the first face and a second side of the sample is in contact with the second face;
    a first terminal, the first terminal in contact with the first side of the sample;
    a second terminal, the second terminal in contact with the second side of the sample;
    a third terminal, the third terminal in contact with the first side of the sample;
    a fourth terminal, the fourth terminal in contact with the second side of the sample;
    a voltage measurement device, wherein the first terminal and the second terminal are electrically coupled to the voltage measurement device;
    a current source, wherein the third terminal and the fourth terminal are electrically coupled to the current source;
    a first temperature sensor configured to output an indication of a first temperature, the first temperature being a temperature of the first side of the sample; and
    a second temperature sensor configured to output an indication of a second temperature, the second temperature being a temperature of the second side of the sample.

2. The apparatus of claim 1, wherein the first terminal and the third terminal are embedded in the first face, and wherein further the second terminal and the fourth terminal are embedded in the second face.

3. The apparatus of claim 2, wherein the first terminal and the third terminal are flush with the first face, and wherein the second terminal and the fourth terminal are flush with the second face.

4. The apparatus of claim 2, wherein the first terminal is surrounded by an insulating layer that electrically insulates the first terminal from the first face.

5. The apparatus of claim 4, wherein the insulating layer comprises alumina.

6. The apparatus of claim 1, further comprising:
a pipe, wherein a fluid is pumped through the pipe; and
a heat exchanger, the heat exchanger in thermal communication with the first face and the pipe.

7. The apparatus of claim 1, further comprising a vacuum chamber, wherein the first heater, the second heater, the first terminal, the second terminal, the third terminal, the fourth terminal, the first temperature sensor, and the second temperature sensor are positioned within the vacuum chamber.

8. The apparatus of claim 1, wherein the first temperature sensor comprises a first thermocouple and the second temperature sensor comprises a second thermocouple.

9. The apparatus of claim 8, the first heater further comprising a first cavity, the first thermocouple positioned inside the first cavity, the second heater further comprising a second cavity, the second thermocouple positioned inside the second cavity.

10. The apparatus of claim 9, the first cavity having a first end, the first heater further comprising an electrical insulating element positioned at the first end of the first cavity, the first thermocouple positioned to be in contact with the electrical insulating element.

11. The apparatus of claim 10, wherein the electrical insulating element comprises a sapphire window.

12. The apparatus of claim 1, the first heater comprising a first metal plate, the first face being a first side of the first metal plate, the second heater comprising a second metal plate, the second face being a first side of the second metal plate.

13. The apparatus of claim 12, wherein the first metal plate comprises nickel.

14. The apparatus of claim 1, wherein the first heater comprises:
a housing;
an endplate, the first face being a first side of the endplate; and
a wire heating element, the wire heating element wrapped around the housing.

15. The apparatus of claim 1, wherein the first heater and the second heater are configured to establish a temperature gradient between the first side of the sample and the second side of the sample.

16. The apparatus of claim 1, wherein the first heater is configured to heat the first face and the second heater is configured to heat the second face.

17. The apparatus of claim 1, the first heater comprising:
a substantially cylindrical core;
an endplate, wherein the first face is a face of the endplate, the endplate being integral and forming a single piece with the core.

18. A method for performing in-situ electrical measurements of a sample subjected to a temperature gradient, comprising:
positioning a sample between a first heater and a second heater, the first heater comprising a first face in contact with a first side of the sample, the second heater comprising a second face in contact with a second side of the sample, the first heater and the second heater configured to establish a temperature gradient between the first side of the sample and the second side of the sample;
applying, by way of a first terminal embedded in the first face of the first heater and a second terminal embedded in the second face of the second heater, a voltage between the first side of the sample and the second side of the sample;
measuring, by way of a third terminal embedded in the first face of the first heater and a fourth terminal embedded in the second face of the second heater,
a current flowing from the first side of the sample to the second side of the sample.

19. An apparatus comprising:
a first heater, the first heater comprising a first plate;
a second heater, the second heater comprising a second plate, the first heater and the second heater positioned such that a thermoelectric sample material is positioned between the first plate and the second plate, wherein the first heater and the second heater establish a temperature gradient between a first side of the sample and a second side of the sample;
a first electrical terminal embedded in the first plate;
a second electrical terminal embedded in the first plate;
a third electrical terminal embedded in the second plate, the first electrical terminal and the third electrical terminal configured for measuring a voltage across the sample; and
a fourth electrical terminal embedded in the second plate, the second electrical terminal and the fourth electrical terminal configured for delivering a current through the sample.

20. The apparatus of claim 19, the first plate and the second plate comprising at least 99% nickel by weight.

* * * * *